United States Patent
Dari et al.

(10) Patent No.: US 6,926,430 B2
(45) Date of Patent: Aug. 9, 2005

(54) ANTI-DAZZLE SAFETY DEVICE FOR A MOTOR VEHICLE

(75) Inventors: Alain Dari, Bobigny Cedex (FR); Grégoire Sadoux, Bobigny Cedex (FR); Julien Moizard, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/446,881

(22) Filed: May 27, 2003

(65) Prior Publication Data

US 2004/0032743 A1 Feb. 19, 2004

(30) Foreign Application Priority Data

May 27, 2002 (FR) .............................. 02 06457

(51) Int. Cl.[7] .................................. B60Q 1/10
(52) U.S. Cl. ...................... 362/466; 362/467
(58) Field of Search ................ 362/460, 462, 362/464, 465, 466, 40, 43

(56) References Cited

U.S. PATENT DOCUMENTS 4,663,696 A * 5/1987 Miyazawa et al. .......... 362/465
6,302,553 B1 * 10/2001 Izawa ........................ 362/37

FOREIGN PATENT DOCUMENTS

| EP | 0 830982 A2 | 3/1998 |
|----|-------------|--------|
| FR | 2813829     | 3/2002 |

* cited by examiner

Primary Examiner—Stephen Husar
Assistant Examiner—Guiyoung Lee
(74) Attorney, Agent, or Firm—Morgan & Finnegan, LLP

(57) ABSTRACT

In the invention, a comparison is carried out within a computer of an item of information relating to a direction of a light beam of a lamp, this item of information being obtained by means of a position sensor, and an item of information relating to an instruction for horizontal displacement of the light beam. If there is not agreement between the two items of information, the computer can then have a degraded operating mode of the lamp adopted by compelling it to orient the light beam downwards in order to remove any risk of dazzling an oncoming driver. To that end, the computer controls a range correction motor in order to bring about a downwards vertical deviation of the light beam.

27 Claims, 2 Drawing Sheets

ANTI-DAZZLE SAFETY DEVICE FOR A MOTOR VEHICLE

The object of the present invention is an anti-dazzle safety device for a motor vehicle lamp. Its aim is in particular to allow the use of a so-called "bend lighting" illumination system without risking dazzling the driver of an oncoming vehicle in the event of malfunctioning of the bend lighting illumination system.

The field of the invention is, in general terms, that of motor vehicle lamps. In this field, different types of function are known, amongst which there are in particular:

sidelights, of low intensity and range;

low beam, or dipped beam, headlights, of stronger intensity and with a range on the road close to 70 metres, which are used mainly at night and whose light beam distribution is such that it makes it possible to not dazzle the driver of an oncoming vehicle;

high beam headlights, and additional long-range type lights, whose field of vision on the road is close to 200 metres, and which must be switched off when another vehicle is oncoming in order to not dazzle its driver;

fog lights.

Furthermore, certain advanced lamps are known, referred to as dual-mode lamps, which combine the low beam headlight and high beam headlight functions: to that end, there is disposed inside the dual-mode lamp a removable screen, consisting for example of a metal plate, capable of changing on command from a first position in which it does not mask the light signal produced by the light source of the lamp, the range of the lamp then corresponding to that of high beam headlights, to a second position in which it masks part of the light signal produced by the light source of the lamp, the range of the lamp thus being limited to that of low beam headlights.

The device according to the invention can be installed in any one of the lamp types which have just been mentioned. Its installation will be detailed more particularly with low beam headlights in response to a particular problem given by way of example only.

Figure 1:
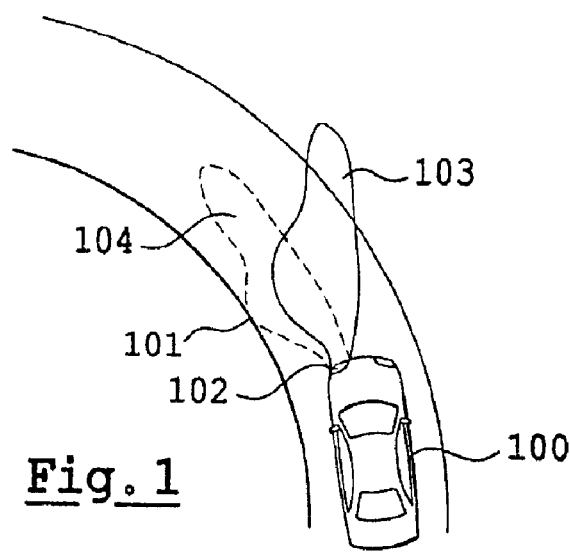

There is known, in the prior art, the bend lighting illumination system which makes it possible to obtain, by means of low beam headlights, a light beam which illuminates in an optimum manner a bend negotiated by a vehicle. Such a system is illustrated in FIG. 1. This figure depicts schematically a vehicle 100 which is following a road with a bend 101. The front of the vehicle is equipped with a set of lamps, and in particular low beam headlights 102. A usual low beam, or dipped beam, headlight illuminates the bend with a light beam 103 depicted in solid lines. As can be seen, part of the light beam 103 does not illuminate the road, and the inside of the bend is not covered by the light beam 103. The illumination of the road by means of the low beam headlights is therefore not optimum and leads to a lack of visibility which can be dangerous for the driver.

In response to this problem, the use has been proposed of a bend lighting system, in which the low beam headlights have the particular feature of providing a light beam 104, depicted in dotted lines, which can change position horizontally. The beam of the lamp is thus oriented, in particular by means of the presence of a suitable motor, in a horizontal direction which can vary by taking into consideration the conditions of the road and the vehicle, such as the presence of a bend, the orientation and speed of the vehicle, etc. As can be seen in FIG. 1, the inside part of the bend 101 is thus much better covered with the second light beam 104 than with the first light beam 103. The shape of the light beams 103 and 104, with spreading out to the right, corresponds to the shape of light beams which can be observed on vehicles travelling in countries where driving is prescribed on the right-hand part of the roadway. In other countries, low beam headlights are designed so that spreading out to the left of the light beam 103 is observed.

The bend lighting system therefore makes it possible to automatically obtain a horizontal displacement of the light beam. Horizontal displacement of the light beam designates the fact that said light beam is capable of changing position horizontally about a vertical imaginary axis, that is to say one perpendicular to the plane of movement of the vehicle, passing approximately through the lamp which is the source of the light beam. Horizontal direction designates a direction contained within the plane of movement of the vehicle.

However, the bend lighting system has a non-negligible risk: at least one of the dipped beam headlights can inopportunely remain locked in a position such that it would dazzle the driver of an oncoming vehicle subsequently. Typically, if the dipped beam headlight remains locked in the position in which it produces the light beam 104, when the vehicle 100 is again on a straight portion of road, it will inevitably dazzle any driver of an oncoming vehicle.

One solution to this problem can consist of the implementation of a redundant system for horizontal displacement of the light beam: such a system would consist of providing in particular another motor which could substitute for the motor initially provided for the bend lighting system in the event of malfunction of the initial motor, in order to bring the light beam back into the non-dazzling area. But such a solution is not satisfactory since it poses in particular problems of manufacturing cost and weight of the illumination system.

The device according to the invention responds to the risk and problem which have just been described. In general terms, the device according to the invention proposes a solution which allows the use of light sources producing a light beam which can be oriented horizontally without risking said light beam remaining locked in a dazzling position. The device according to the invention can be implemented easily, that is to say without entailing any extra manufacturing cost or addition of too many control elements.

To that end, the invention takes advantage in particular of the fact of the presence either of a second motor in the lamp devices of the vehicles, this second motor being attached to a system for automatic correction of the illumination range of the lamp, or of a device for controlling the trim of the vehicle itself. Such devices have the function of keeping the range of the lamp constant according to the load of the vehicle and/or its trim, in particular when the vehicle accelerates. It can therefore concern a dynamic and/or static correction system. Thus, for example, when the vehicle accelerates, the light beam is lowered slightly and when the vehicle brakes, the light beam is raised slightly. The motor of the illumination range correction system therefore acts on the vertical direction of the light beam.

Furthermore, in the invention, two essential items of information are made use of: on the one hand an item of information relating to a horizontal direction of the light beam, this item of information being obtained by means of a position sensor; on the other hand an item of information relating to an instruction for horizontal displacement of the light beam. These two items of information are processed and compared within a computer which makes it possible to determine whether they are not incompatible. If there is not agreement between the two items of information, the computer can then have a degraded operating mode of the lamp adopted by compelling it to orient the light beam downwards in order to remove any risk of dazzling an oncoming driver. To that end, the computer controls the range correction motor, or the trim control device, in order to bring about a maximum downwards vertical deviation of the light beam.

The invention therefore essentially relates to a safety device for a lamp for a motor vehicle, the lamp comprising at least:

a light source associated with a reflector for producing a light beam characterised in particular by an instantaneous direction contained in a horizontal or substantially horizontal plane;

a mechanism for horizontal displacement of the light beam comprising in particular a first motor for making the instantaneous direction of the light beam change position;

a system for automatic correction of the illumination range of the lamp comprising in particular a second motor, or a device for controlling the trim of the vehicle, for making the light beam change position vertically;

characterised in that the correction device comprises:

a position sensor for determining an item of information relating to the instantaneous direction of the light beam;

a computer for comparing the item of information relating to the instantaneous horizontal direction of the light beam and a light beam horizontal displacement control, said computer being capable of activating the second motor of the automatic illumination range correction system or the vehicle trim control device in order to orient the light beam downwards when the item of information relating to the instantaneous direction of the light beam and the light beam horizontal displacement control are not in agreement.

In the sense of the invention, horizontal or substantially horizontal means a plane which can be actually strictly horizontal or which is slightly inclined with respect to the horizontal, in particular by an angle less than 0°, in particular between −0.25° and −1.5° (the minus sign signifying that the lamps will cast light inclined slightly downwards).

The device according to the invention can also have one or more of the following characteristics:

the computer activates the second motor of the automatic illumination range correction system or the vehicle trim control device in order to orient the light beam downwards when an item of information relating to the instantaneous direction of the light beam and the control for displacement (essentially horizontal) of the light beam are not in agreement and the value of a defined angle between a reference direction (in particular horizontal or substantially horizontal) and the instantaneous direction (in particular horizontal or substantially horizontal) is greater than the value of a reference angle, for example between 0 degrees and 5 degrees, and preferably between 0.5 degrees and 2 degrees, the reference angle being defined between the reference direction and a non-dazzle limit direction (in particular horizontal or substantially horizontal);

the non-dazzle limit direction is defined solely on one side of the reference direction;

the reference direction corresponds to an instantaneous direction of the light beam when the vehicle is travelling in a straight line;

the position sensor is of the two-state type in order to detect solely the instantaneous direction of the light beam passing the non-dazzle limit direction;

the position sensor is a light sensor, which can in particular be placed in the lamp, or a rotary sensor, which can in particular be placed at a link placed between a first plate of the lamp, adapted to trim correction, and a second plate of the lamp, movable with respect to the first plate;

the computer is mounted in the lamp or outside the lamp;

the position sensor is mounted on a first plate of the lamp, or on a second plate of the lamp movable with respect to the first plate;

each lamp is associated with a computer or two identical lamps are associated with a single computer;

the orientation of the light beam downwards following the activation of the second motor by the computer makes it possible to obtain a lower light beam than with the automatic illumination range correction system controlling the second motor without the intervention of the computer;

the lamp associated with the correction system is a low beam headlight;

the mechanism for horizontal displacement of the light beam is automatically activated when the motor vehicle manoeuvres in a bend so as to illuminate in an optimum manner the path followed by the vehicle.

The invention also relates to a motor vehicle equipped with a safety device which has just been mentioned, and in particular a motor vehicle with a safety device which comprises in particular a computer common to two lamps having the same function, the computer being disposed outside the lamps, or a computer assigned to each lamp, each computer being disposed inside each lamp. Furthermore, the motor vehicle according to the invention can comprise a trim control system acting in the safety device.

Figure 2:
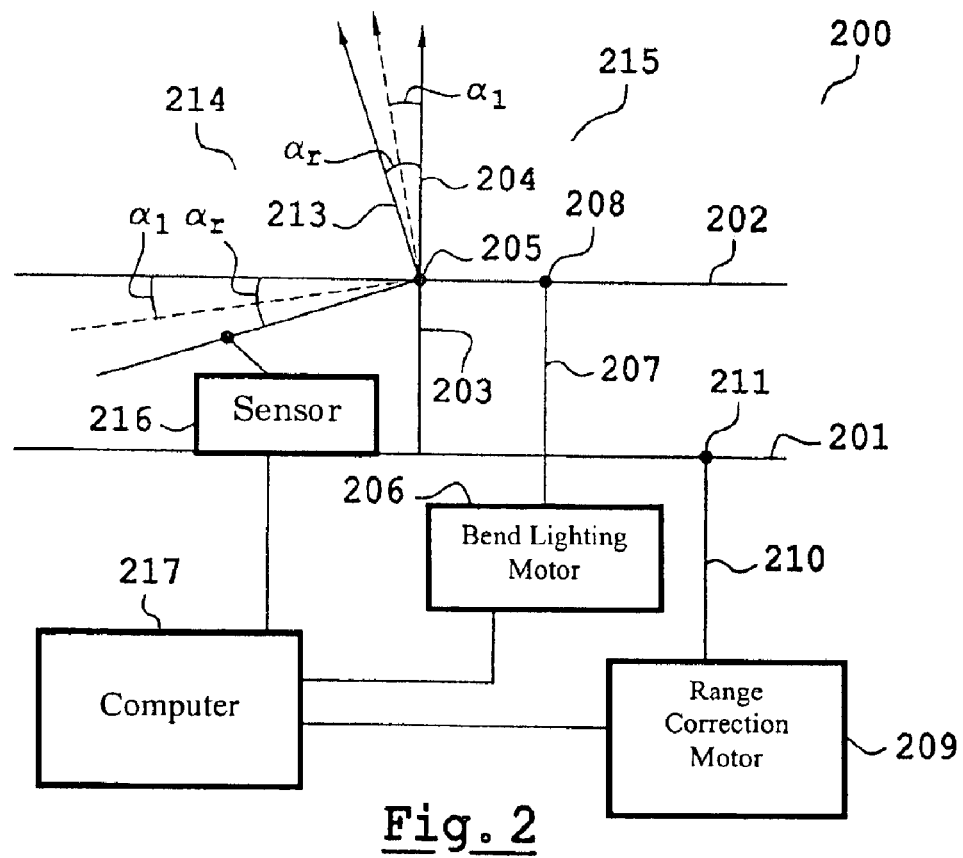
Figure 3:
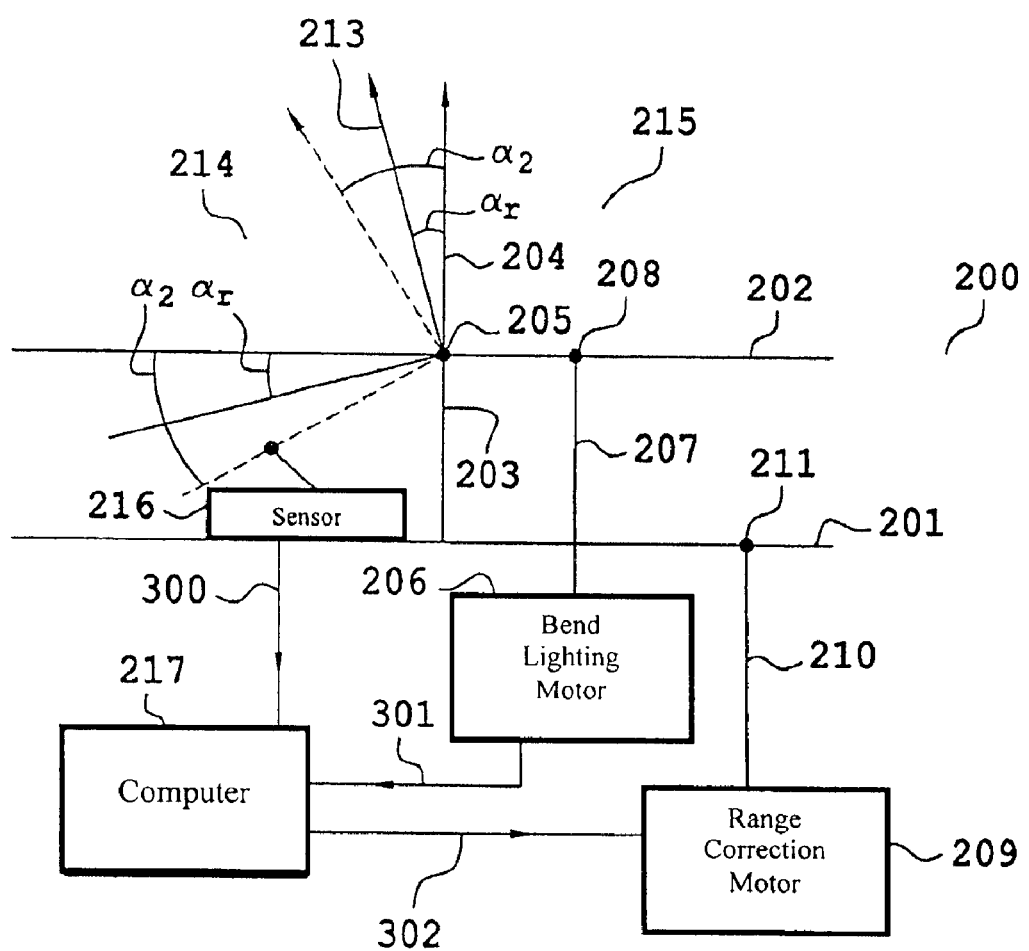

The invention and its various applications will be better understood from a reading of the following description and an examination of the accompanying figures. These are presented for information only and are in no way limitative of the invention. In particular, the lamp device according to the invention is illustrated in the case of use in a low beam headlight, but this device is suitable for any lamp device of a vehicle. The figures show:

In FIG. 1, already described, an illustration of the use of a bend lighting system;

In FIG. 2, a simplified illustration of the device according to the invention in a first position of the light beam;

In FIG. 3, a simplified illustration of the device according to the invention in a second position of the light beam.

FIG. 2 shows, in a top view and in a simplified manner, a motor vehicle lamp 200. The lamp 200 comprises in particular a first plate 201 oriented vertically for trim correction and a second plate 202 movable with respect to the first plate 201 and oriented by the bend lighting correction system. On the movable plate 202 there are in particular fixed a reflector and a light source, not depicted, which give rise to a light beam. A set of links 203 makes it possible to keep the movable plate 202 firmly attached to the first plate 201. The set of links 203 can adopt different structures and articulations.

When the vehicle moves in a straight manner, that is to say on a portion of road with no bend, the direction of the light beam is identified by means of a main horizontal axis referred to as the horizontal reference direction 204. This main axis is contained in a horizontal plane, that is to say a plane approximately parallel to the road followed by the vehicle. The main axis can also be contained in a substantially horizontal plane, that is to say in a plane slightly inclined with respect to the horizontal, the angle of inclination being preferably between −0.25 degrees and −1.5 degrees, the minus sign designating a plane directed downwards. At each instant, the switched on lamp 200 emits a light beam characterised in particular by an instantaneous horizontal direction, designated in the remainder of the description as simply a horizontal direction.

The lamp 200 also comprises a first motor 206, referred to as the bend lighting motor, which makes it possible to make the first plate 201 move so as to displace the light beam horizontally as explained previously. To that end, the bend lighting motor 206 can for example control at least one rod 207 fitted into at least one housing 208 formed in the movable plate 202 so that the lamp 200 can change position about an imaginary axis of vertical rotation 205 perpendicular to the horizontal reference direction 204.

The lamp 200 can furthermore comprise a second motor 209, referred to as the range correction motor, which makes it possible to make the first plate 201 move so as to displace the light beam vertically as also explained previously within the context of the automatic illumination range correction system of the lamp. To that end, the range correction motor 209 can for example control at least one rod 210 fitted into at least one housing 211 formed in the first plate 201 so that the lamp 200 can change position about an imaginary axis of horizontal rotation, not depicted, perpendicular to the horizontal reference direction 204. The first plate 201 can also be set in motion by a trim control device present in certain vehicles, in particular vehicles with computer-controlled suspension.

The bend lighting motor 206 and the range correction motor 209—or the trim control device—are controlled by the computer 217 which, in order to control the various movements to be forced upon the lamp, collects and interprets a set of parameters associated with the vehicle and the road on which it is moving, for example the speed of the vehicle, the orientation of its wheels, its acceleration or deceleration, steering wheel angle information or trim information.

According to the invention, a non-dazzle limit horizontal direction 213 passing through the axis of rotation 205 is defined. When, following a rotational movement about the vertical axis 205, the horizontal direction of the light beam has moved away from the horizontal reference direction 204 sufficiently to go beyond the non-dazzle limit horizontal direction 213, it is considered that the light beam has entered a dazzle area 214.

In other words, the non-dazzle limit horizontal direction 213 separates the horizontal plane into two areas: a first area, referred to as the non-dazzle area 215 in which the horizontal direction of the light beam must be situated in order to not dazzle an oncoming driver, and a second area, referred to as the dazzle area 214, in which there is a risk of dazzling an oncoming driver when the horizontal direction of the light beam is situated therein. The relative position of the horizontal direction of the light beam with respect to the horizontal reference direction 204 can be identified by an angle, referred to as the horizontal deflection angle $\alpha$. A reference deflection angle $\alpha r$ is defined, which is preferably between 0 degrees and 5 degrees, in particular between 0.5 degrees and 2 degrees, between the horizontal reference direction 204 and the non-dazzle limit horizontal direction 213.

Depending on the prescribed side of the road for driving on, the non-dazzle limit horizontal direction 213 is defined on the left (driving on the right) or on the right (driving on the left) of the horizontal reference direction 204. Thus, in the case illustrated, which corresponds to the case of driving on the right, a light beam locked in the non-dazzle area 215, irrespective of the deviation of its horizontal direction with respect to the horizontal reference direction 204, will not dazzle an oncoming driver. It is therefore not essential to define a non-dazzle limit direction in the non-dazzle area 215.

Provision can be made, in order to improve the detection of a possible malfunction of the bend lighting motor 206, to define in the device of the invention two non-dazzle limit directions distributed either side of the horizontal reference direction 204, for example symmetrically with respect to this direction. Such an implementation can be particularly useful in systems which can be used for both traffic driving on the right and traffic driving on the left.

In the invention, provision is made for the use of a position sensor 216 and a computer 217. A computer typically consists of a microprocessor associated with a program memory and/or a data memory. In the example illustrated, the sensor 216 is mounted on the first plate 201 of the lamp 200, but in other example embodiments of the device according to the invention, it could have been mounted at other places, for example on the movable plate 202. In the example embodiment under consideration, the sensor 216 is of the two-state type, that is to say it can change from an active state to an inactive state and vice versa. In the invention, the sensor 216 is activated as soon as the movable plate is in motion with respect to the first plate and has performed a rotation about the vertical axis 205 by an angle $\alpha$ greater than $\alpha r$, that is to say when the horizontal direction of the light beam has entered the dazzle area 214.

In order to compare the angles $\alpha$ and $\alpha r$, it is important to take, for $\alpha r$, the algebraic value of the angle between the horizontal reference direction 204 and the non-dazzle limit horizontal direction 213, and, for $\alpha$, the algebraic value of the angle between the horizontal reference direction 204 and the horizontal direction of the light beam, by choosing the positive direction of rotation such that $\alpha r$ is positive. The value of the angle $\alpha r$ can for example be stored in a data memory of the computer 217. The two-state type sensor 216 simply detects a transition corresponding to the instantaneous horizontal direction passing the non-dazzle limit horizontal direction 213. Such a sensor is very reliable and robust.

Other types of sensor can be used in the device according to the invention: in particular, a light sensor can be involved, which, placed in the lamp 200, makes it possible to detect the transition between the dazzling area 214 and the non-dazzling area 215; or else a rotary sensor, which, placed at the link 203 between the movable plate 202 and the first plate 201, also makes it possible to detect the transition between the dazzling area 214 and the non-dazzling area 215.

Irrespective of the type of sensor 216 used, a mode of operation of the device according to the invention can be defined in which, as long as $\alpha$ is less than $\alpha r$, the position sensor 216 is not activated and no information is transmitted to the computer 217. This is the case in FIG. 2, where the angle $\alpha 1$ is less than the reference angle $\alpha r$. On the other hand, as soon as—and as long as—$\alpha$ is greater than $\alpha r$, the position sensor 216 is activated and an information item 300, referred to as limit angle overstepping information, is transmitted to the computer 217. This is the case in FIG. 3, where the angle $\alpha 2$ is greater than the reference angle $\alpha r$. In this case, the computer requests an information item 301, referred to as set point information, from the bend lighting motor 206. The set point information item 301 can also be transmitted directly by the computer 217.

This information item reveals whether the motor 206 has actually received an instruction ordering it to make the light beam enter the dazzle area 214. If this is the case, the information items 300 and 301 are in agreement and a degraded operating mode of the lamp is not entered. If this is not the case, that is to say if the information items 300 and 301 are not in agreement, the computer 217 transmits an instruction 302 to the range correction motor 209 or the vehicle trim control device so that it brings about the downwards inclination of the light beam. The inclination ordered by the computer 217 can be greater than the inclination which could be obtained until then by means of the automatic illumination range correction systems. To that end, a lengthening of the rod 210 compared with the similar rods used in the prior art can for example be provided.

The lamp is thus put into a degraded operating mode which nevertheless has the advantage of not dazzling an oncoming driver whilst retaining a light beam which is useful for driving. It therefore makes it possible, from different points of view and by way of example, to make the bend lighting system safe.

According to different embodiments of the device according to the invention, the computer 217 can be internal or external to the lamp 200; it can manage a single side of the vehicle or both sides, that is to say it can control two motors and one sensor, or four motors and two sensors. Centralisation of the range correction and bend lighting functions on a single electronic module can allow the interaction between these two functions to be simplified. Furthermore, the computer 217 can also provide the management of other functions, like for example that of bulb control.

The device according to the invention has been described in the case of driving on the right. It is clearly of course adaptable for driving on the left: referring to FIGS. 2 and 3, it is sufficient to take for the non-dazzle limit horizontal direction 213 another non-dazzle limit horizontal direction which is, with respect to the horizontal reference direction 204, symmetrical to the one depicted.

Finally, it is obvious that, even though the lamp devices of a vehicle are most often present in pairs, the device according to the invention can be installed for a single lamp.

What is claimed is:

1. A safety device for a lamp for a motor vehicle, the lamp comprising at least:
   a light source associated with a reflector for producing a light beam characterised in particular by an instantaneous direction contained in a horizontal or substantially horizontal plane;
   a mechanism for horizontal displacement of the light beam comprising in particular a first motor for making the instantaneous horizontal direction of the light beam change position; and
   a system for automatic correction of an illumination range of the lamp comprising in particular a second motor, or a device for controlling the trim of the vehicle, for making the light beam change position vertically, wherein the correction device comprises:
   a position sensor for determining an item of information relating to the instantaneous direction of the light beam; and
   a computer for comparing the item of information relating to the instantaneous horizontal direction of the light beam and a light beam horizontal displacement control, said computer activating the second motor of the automatic illumination range correction system or the vehicle trim control device in order to orient the light beam downwards when the item of information relating to the instantaneous direction of the light beam and the light beam horizontal displacement control are not in agreement and the value of a defined angle ($\alpha$) between a reference direction and the instantaneous direction is greater than the value of a reference angle ($\alpha r$), the reference angle ($\alpha r$) being defined between the reference direction and a non-dazzle limit direction.

2. A device according to claim 1, wherein the non-dazzle limit horizontal direction is defined solely on one side of the horizontal reference direction.

3. A device according to claim 2, wherein the reference direction corresponds to an instantaneous direction of the light beam when the vehicle is traveling in a straight line.

4. A device according to claim 2, wherein the reference angle ($\alpha r$) is between 0 degrees and 5 degrees.

5. A device according to claim 2, wherein the reference angle ($\alpha r$) is between 0.5 degrees and 2 degrees.

6. A device according to claim 2, wherein the position sensor is of the two-state type in order to detect solely the instantaneous horizontal direction of the light beam passing the non-dazzle limit horizontal direction.

7. A device according to claim 1, wherein the reference direction corresponds to an instantaneous direction of the light beam when the vehicle is traveling in a straight line.

8. A device according to claim 7, wherein the reference angle ($\alpha r$) is between 0 degrees and 5 degrees.

9. A device according to claim 7, wherein the reference angle ($\alpha r$) is between 0.5 degrees and 2 degrees.

10. A device according to claim 7, wherein the position sensor is of the two-state type in order to detect solely the instantaneous horizontal direction of the light beam passing the non-dazzle limit horizontal direction.

11. A device according to claim 1, wherein the reference angle ($\alpha r$) is between 0 degrees and 5 degrees.

12. A device according to claim 11, wherein the position sensor is of the two-state type in order to detect solely the instantaneous horizontal direction of the light beam passing the non-dazzle limit horizontal direction.

13. A device according to claim 1, wherein the position sensor is of the two-state type in order to detect solely the instantaneous horizontal direction of the light beam passing the non-dazzle limit horizontal direction.

14. A device according to claim 1, wherein the position sensor is a light sensor, in particular placed in the lamp, or a rotary sensor, in particular placed at a link placed between a first plate of the lamp, adapted to trim correction, and a second plate of the lamp, movable with respect to the first plate.

15. A device according to claim 1, wherein the computer is mounted in the lamp or outside the lamp.

16. A device according to claim 1, wherein the position sensor is mounted on a first plate of the lamp.

17. A device according to claim 1, wherein the position sensor is mounted on a second plate of the lamp, movable with respect to a first plate of the lamp.

18. A device according to claim 1, wherein each lamp is associated with a computer.

19. A device according to claim 1, wherein two identical lamps are associated with a single computer.

20. A device according to claim 1, wherein the orientation of the light beam downwards following the activation of the second motor by the computer makes it possible to obtain a light beam oriented lower than with the automatic illumination range correction system controlling the second motor without the intervention of the computer.

21. A device according to claim 1, wherein the lamp associated with the correction system is a low beam headlight.

22. A device according to claim 1, wherein the mechanism for horizontal displacement of the light beam is automatically activated when the motor vehicle maneuvers in a bend so as to illuminate in an optimum manner the path followed by the vehicle.-

23. A motor vehicle equipped with a safety device according to claim 1.

24. A motor vehicle according to claim 23, wherein the safety device comprises a computer common to two lamps having the same function, the computer being disposed outside the lamps, or a computer assigned to each lamp, each computer being disposed inside each lamp.

25. A motor vehicle according to claim 24, wherein it comprises a trim control system acting in the safety device.

26. A motor vehicle according to claim 23, comprising a trim control system acting in the safety device.

27. A device according to claim 1, wherein the reference angle ($\alpha r$) is between 0.5 degrees and 2 degrees.

* * * * *